W. L. CLARK.
DRILLING MACHINE.
APPLICATION FILED JUNE 28, 1916.
1,272,219.
Patented July 9, 1918.
12 SHEETS—SHEET 6.
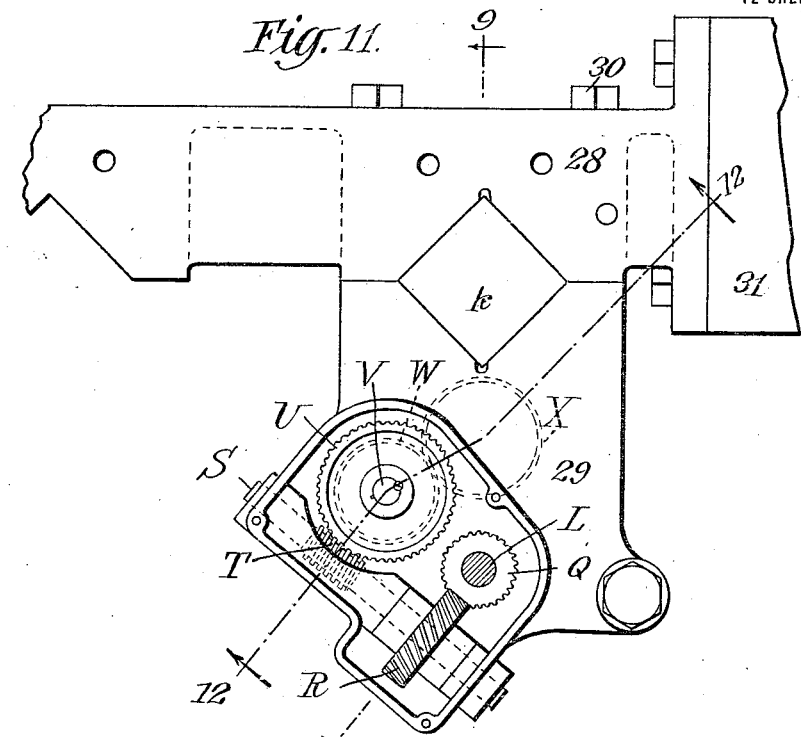
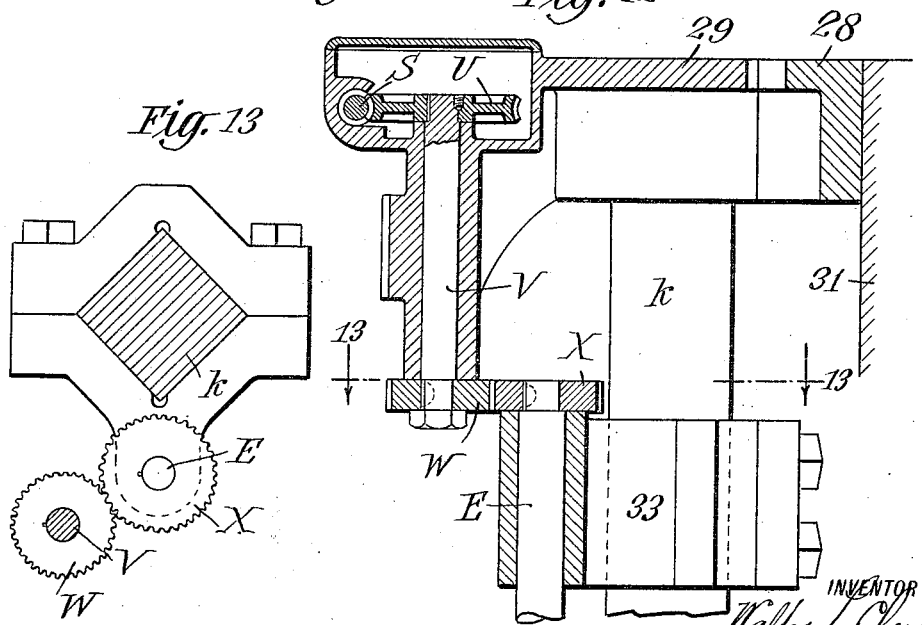
INVENTOR
Walter L. Clark
BY
Anthony Mina, ATTORNEY

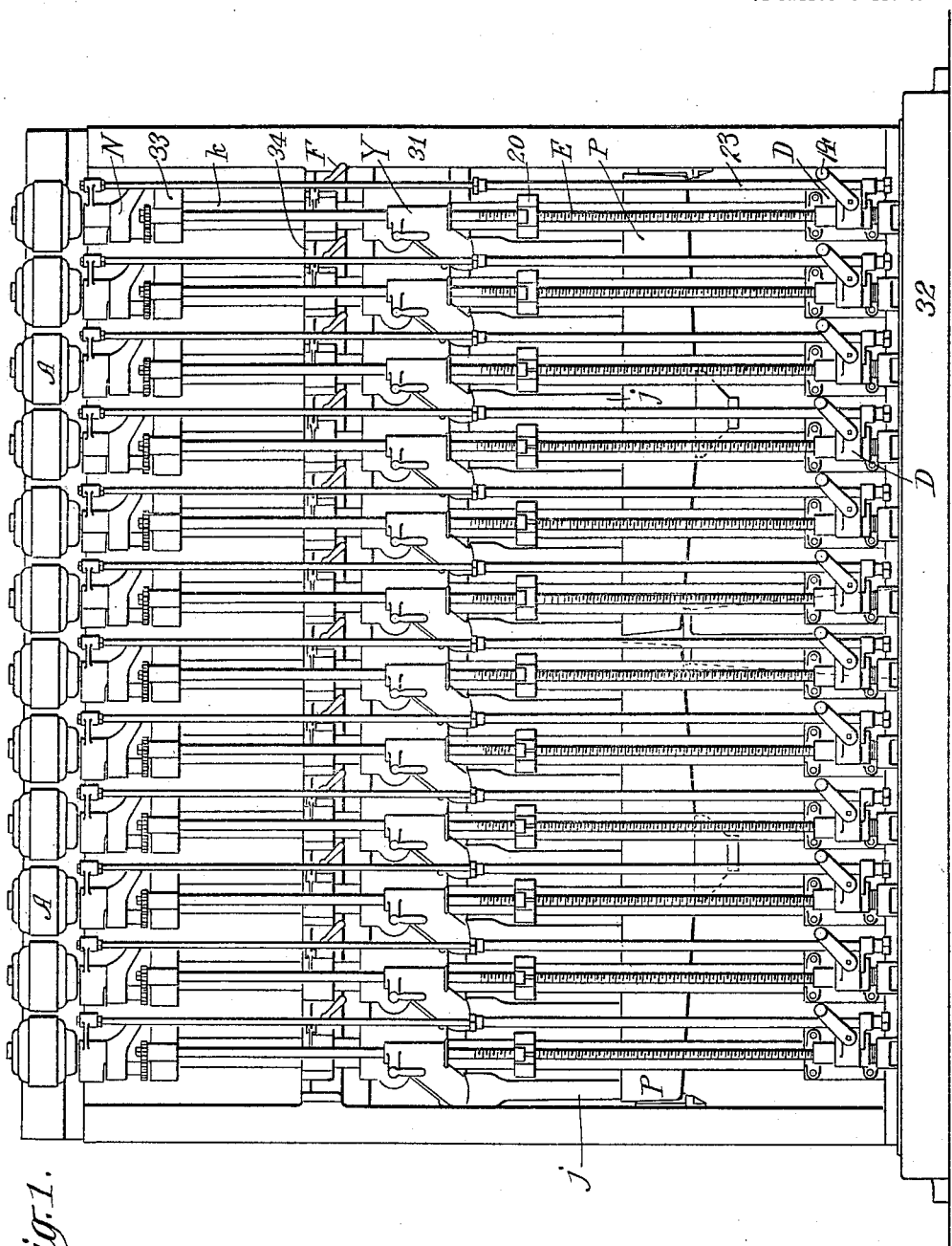

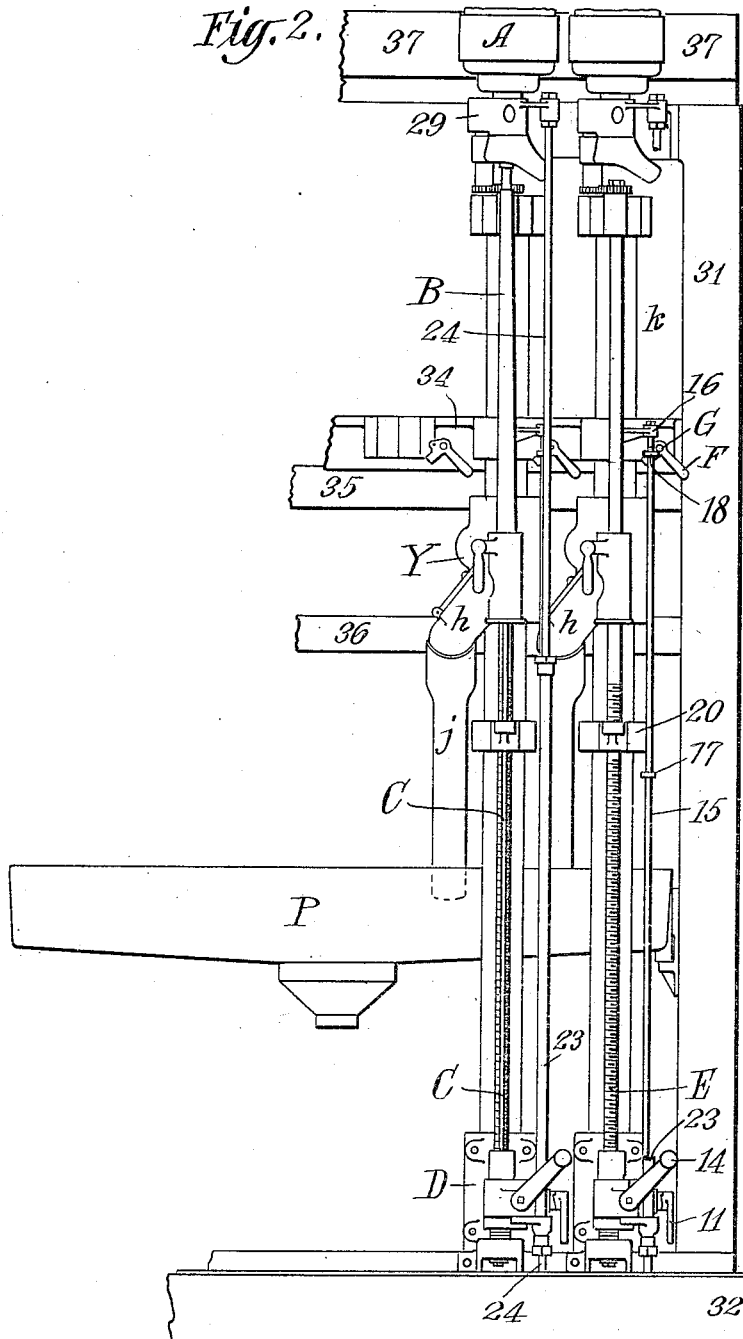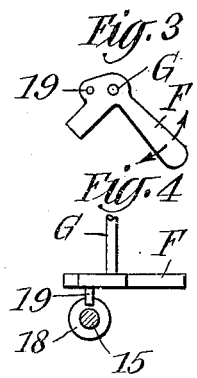

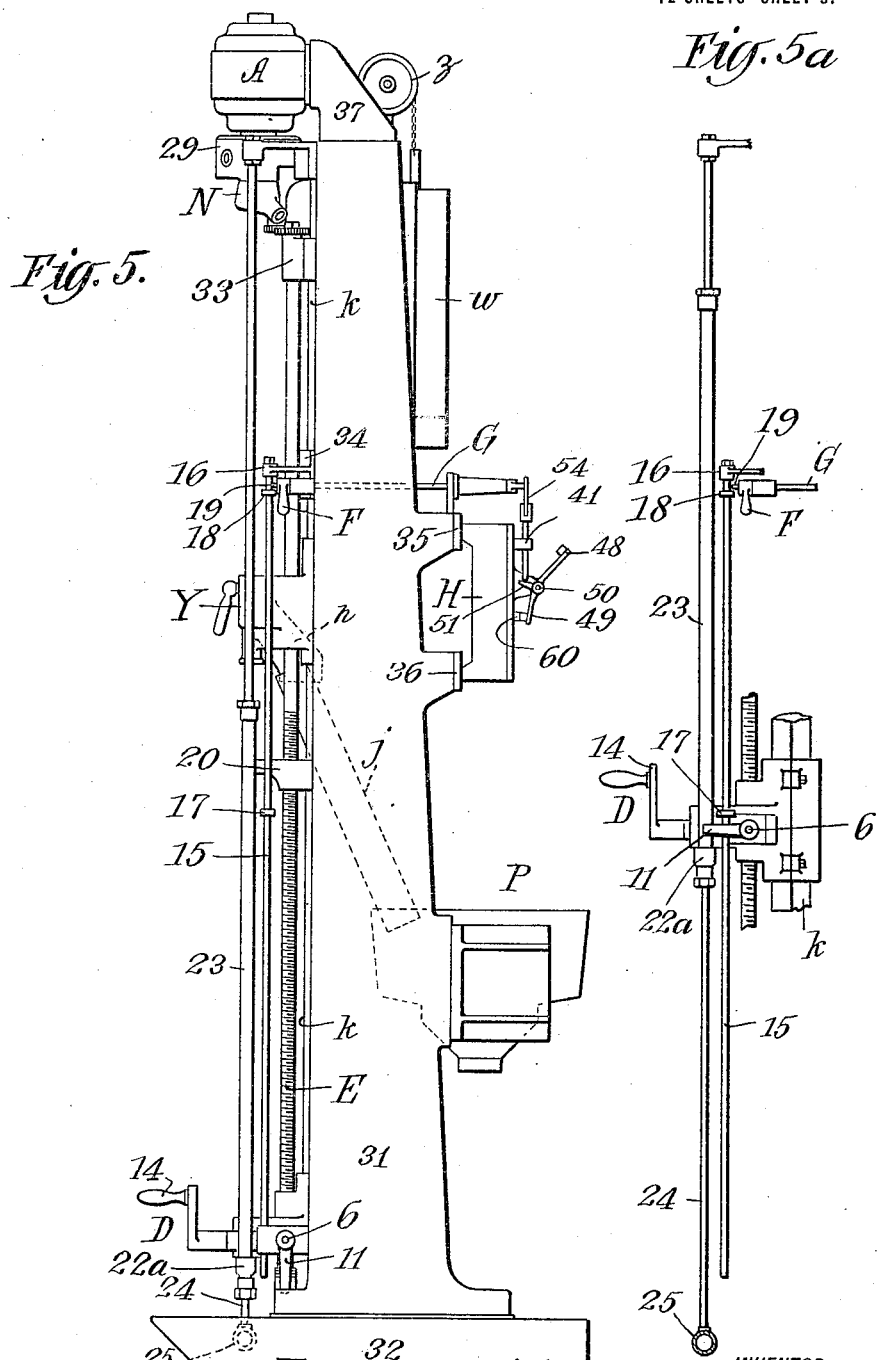

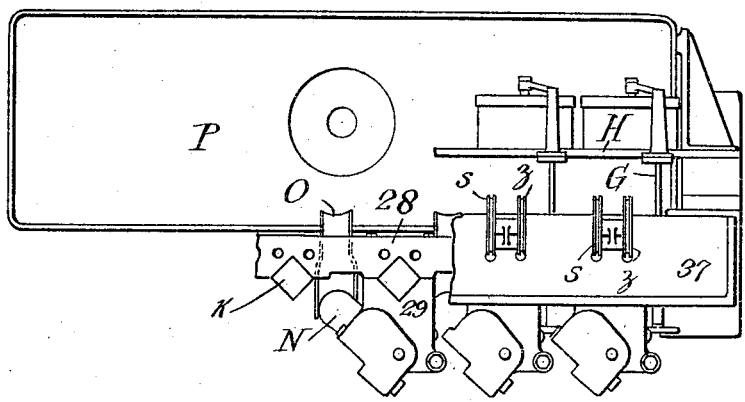
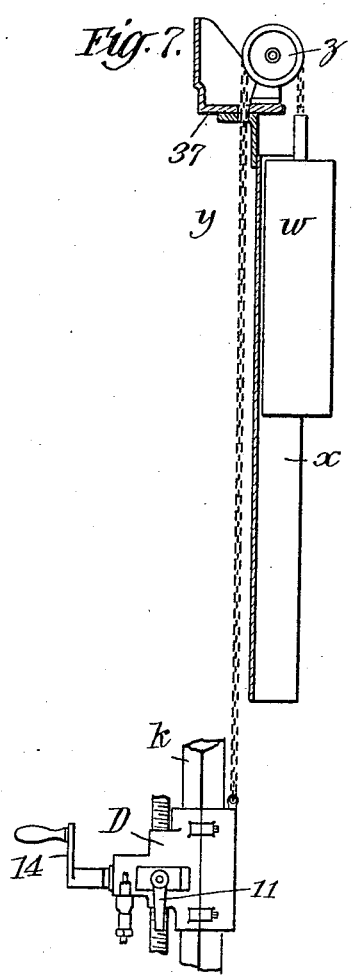
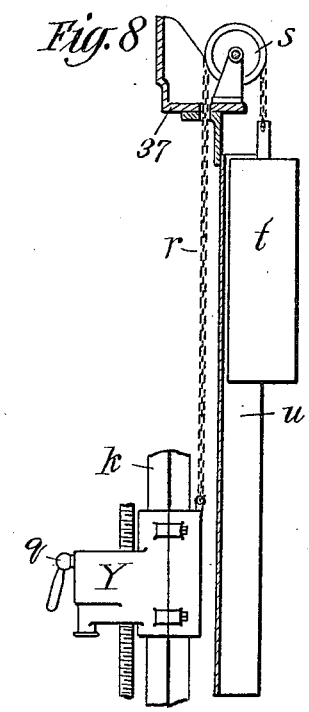

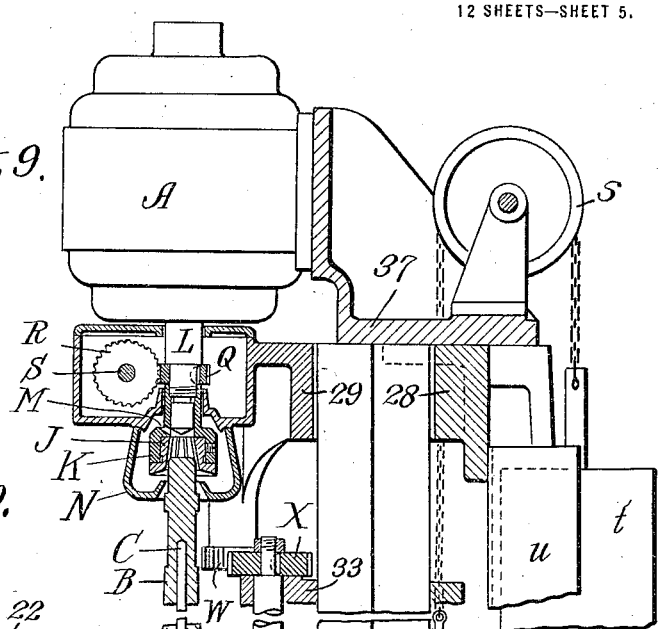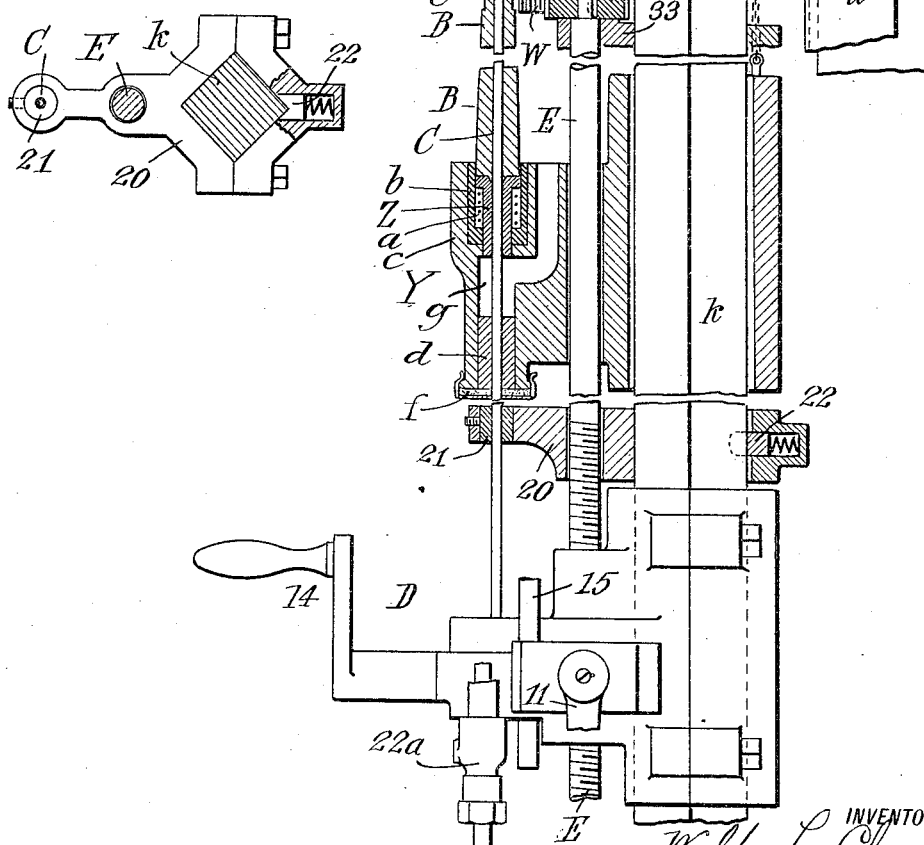

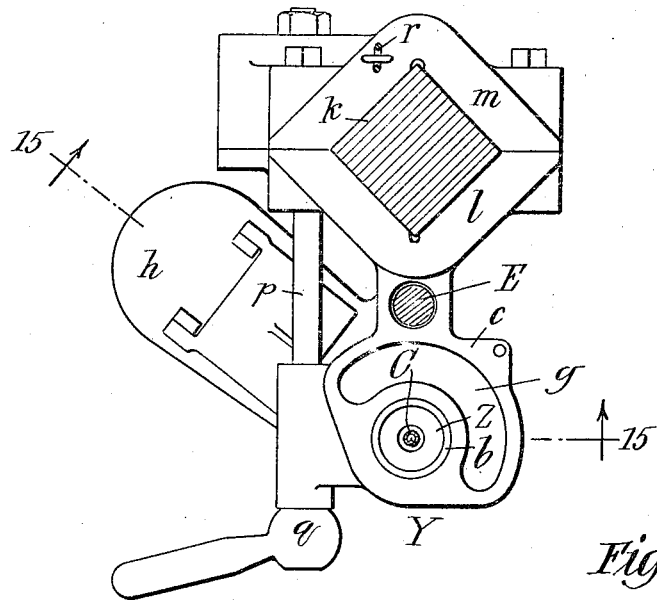
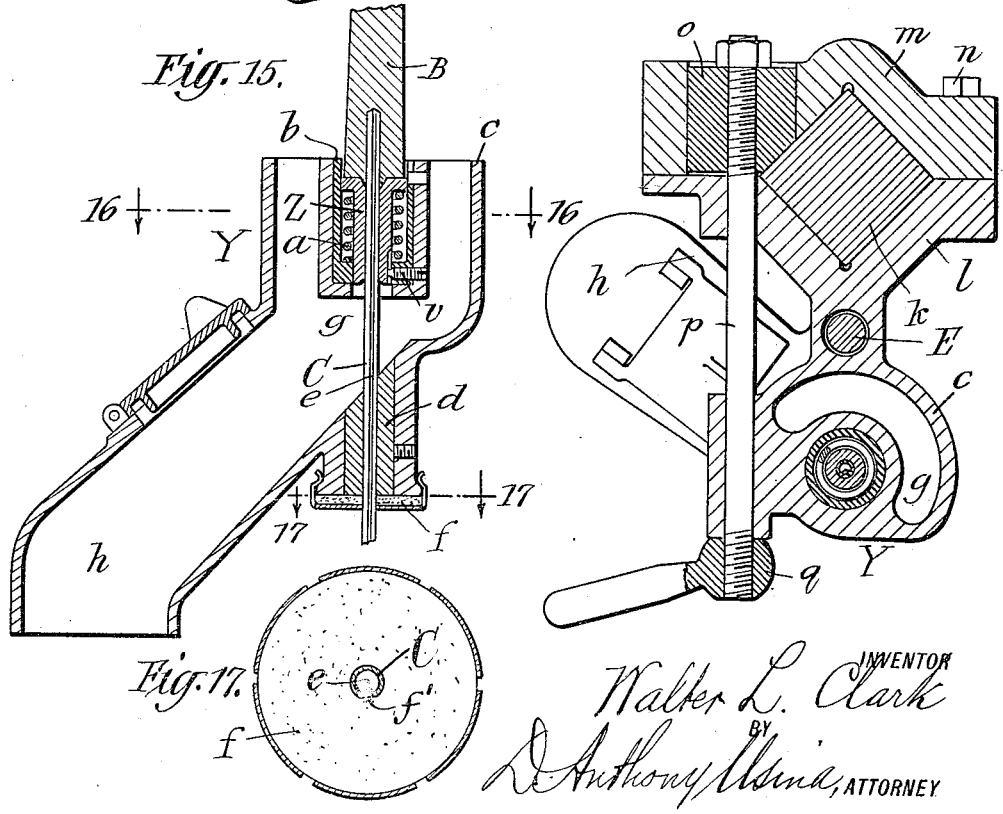

W. L. CLARK.
DRILLING MACHINE.
APPLICATION FILED JUNE 28, 1916.

1,272,219.

Patented July 9, 1918.
12 SHEETS—SHEET 8.

INVENTOR
Walter L. Clark
BY
D. Anthony Usina, ATTORNEY

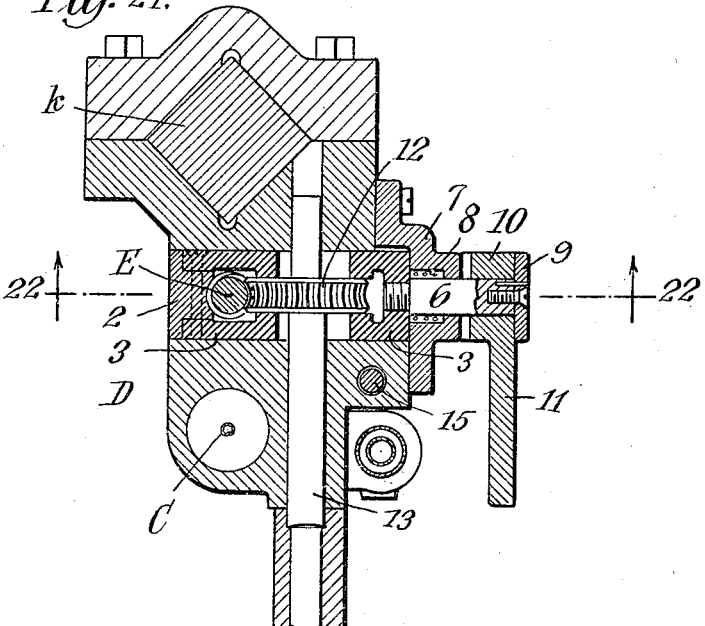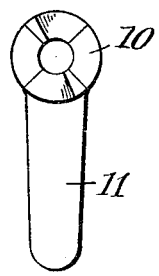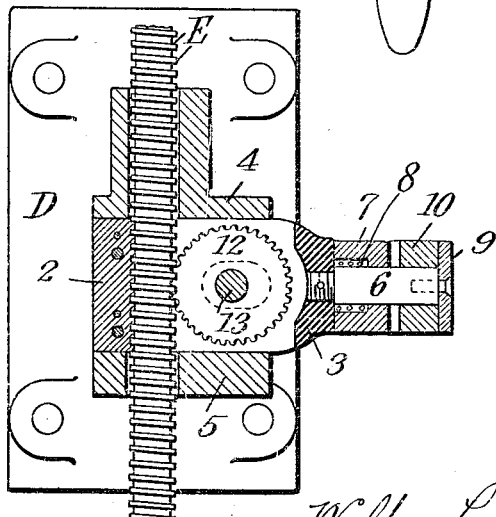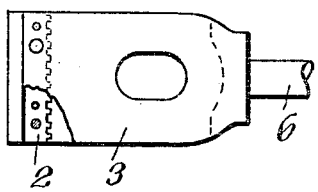

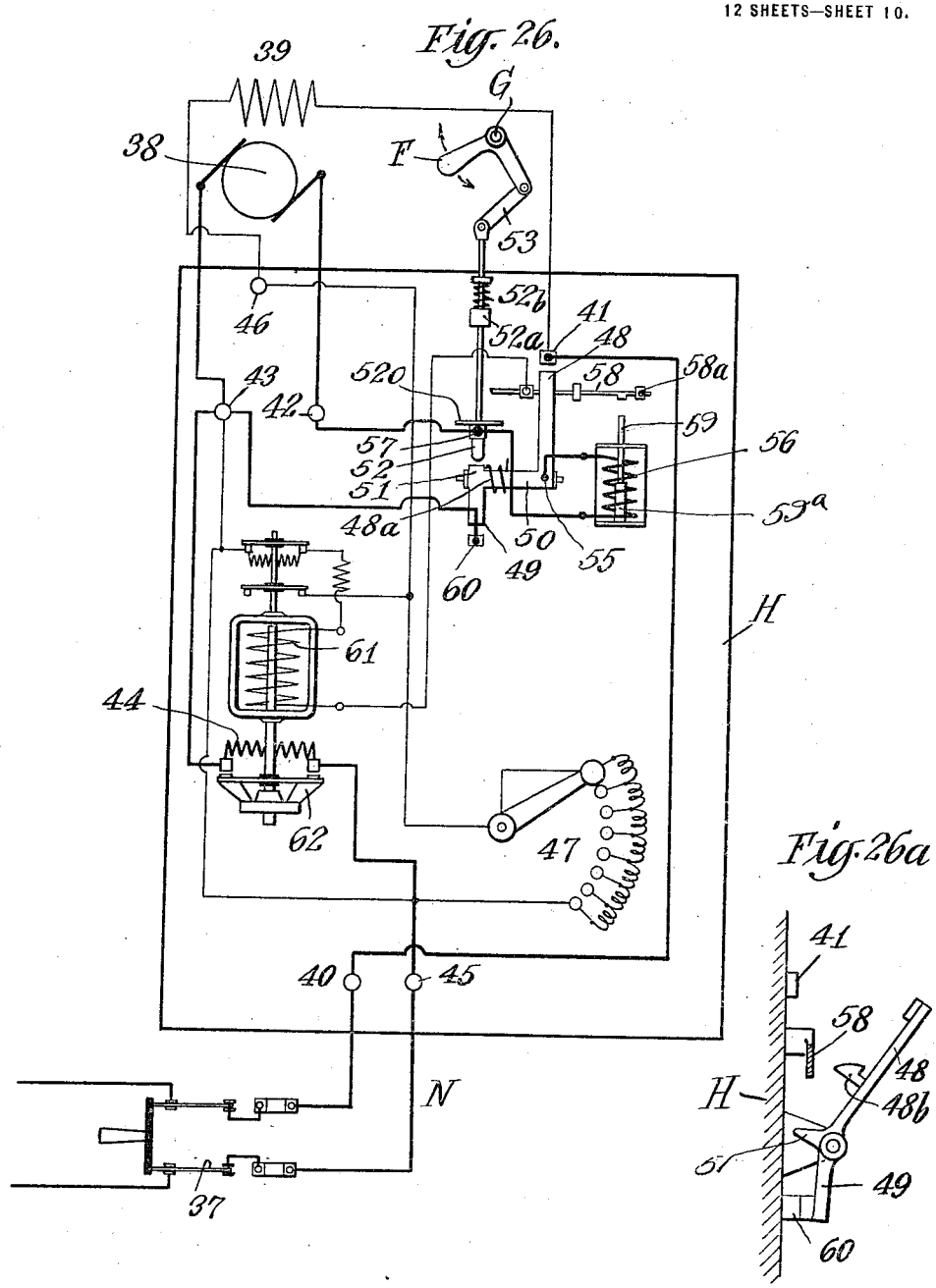

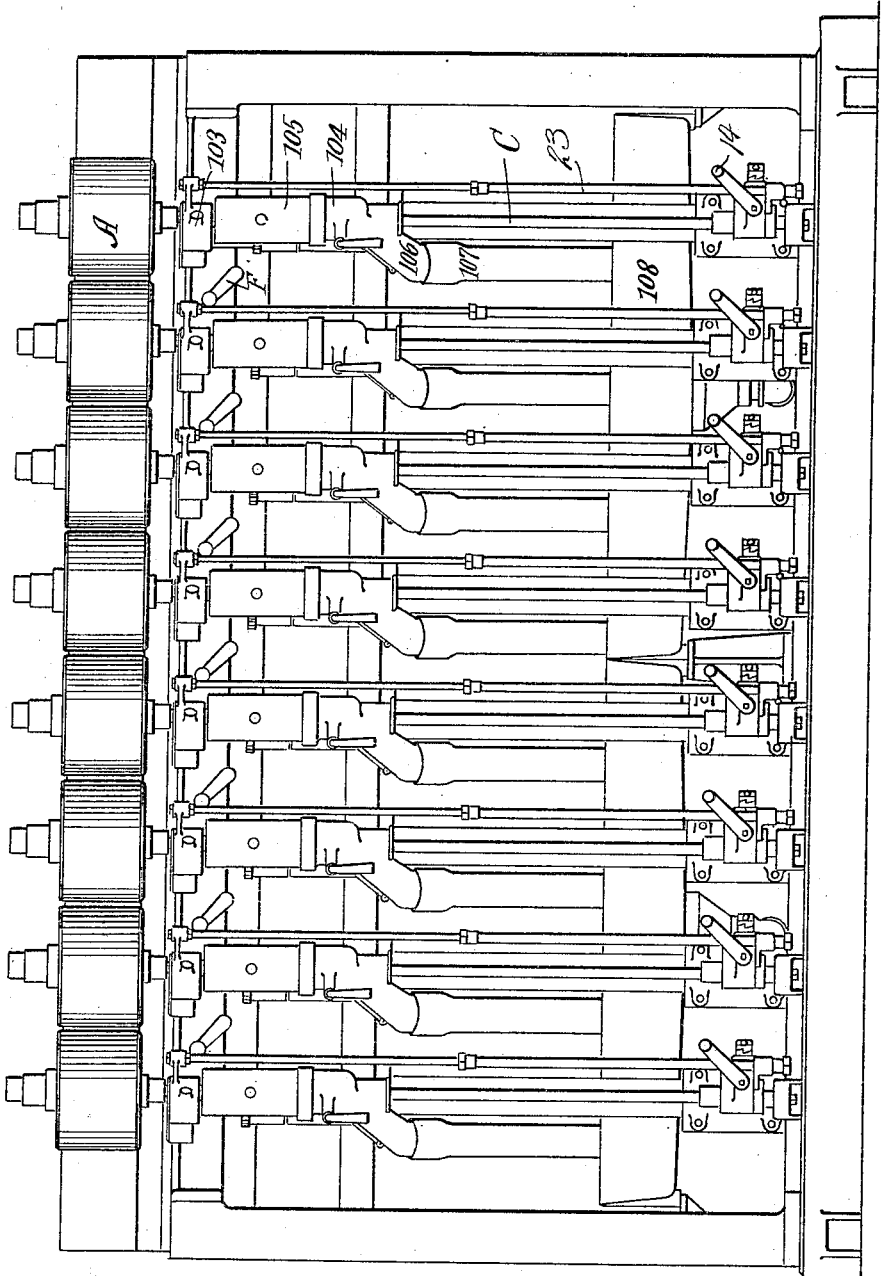

W. L. CLARK.
DRILLING MACHINE.
APPLICATION FILED JUNE 28, 1916.
1,272,219.
Patented July 9, 1918.
12 SHEETS—SHEET 12.
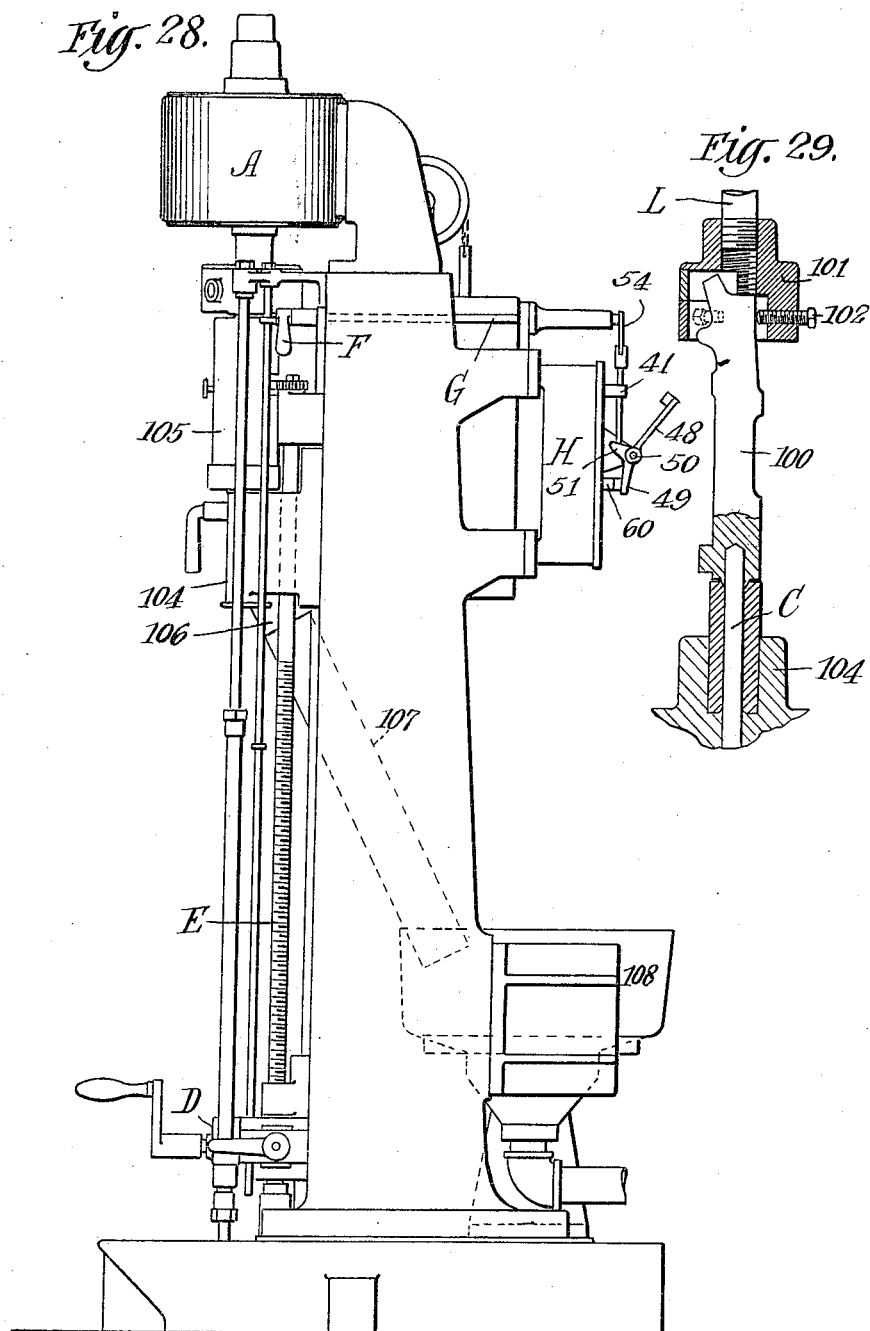
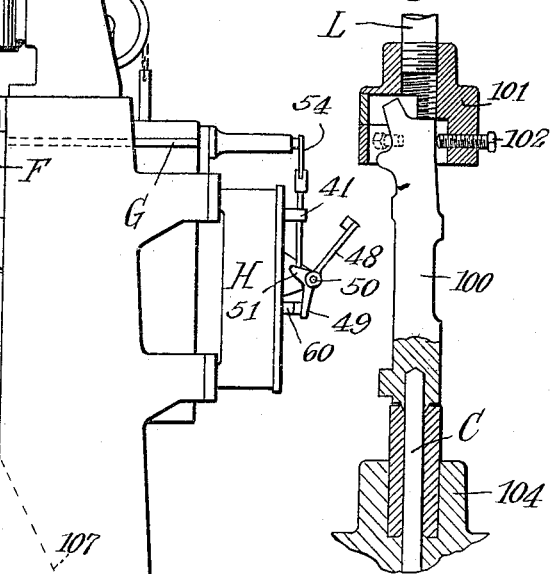
INVENTOR
Walter L. Clark
BY
D. Anthony Alsina, ATTORNEY

UNITED STATES PATENT OFFICE.

WALTER L. CLARK, OF SPRINGFIELD, MASSACHUSETTS.

DRILLING-MACHINE.

1,272,219.  Specification of Letters Patent.  Patented July 9, 1918.

Application filed June 28, 1916. Serial No. 106,367.

*To all whom it may concern:*

Be it known that I, WALTER L. CLARK, a citizen of the United States, residing in Springfield, Massachusetts, have invented certain new and useful Improvements in Drilling-Machines, of which the following is a specification.

This invention provides a drilling machine which is especially adapted for drilling long holes and for handling long narrow work-pieces such, for example, as rifle barrels and receivers. The machine as illustrated is particularly designed for drilling, but by the substitution of other tools for drills it may be made to perform other analogous operations. It is designed to operate on a comparatively large number of work-pieces within a very compact space so that a large output can be secured with a single operator to control the operation of a large number of drills. It also economizes floor space as compared with other machines for performing the same work. A plurality of drills are operated simultaneously, but independently of each other, and means are provided for stopping the operation of any drill automatically when abnormal conditions arise so that the operator has little to do but to insert the work-pieces, start the operation and remove the work-pieces when the operation is done. Various other features of advantage are referred to hereinafter in detail.

The accompanying drawings illustrate embodiments of the invention, Figures 1 to 26 illustrating a machine for drilling rifle barrels, and Figs. 27 to 29 a machine for drilling receivers.

Fig. 1 is a front elevation of the machine omitting the barrels and the drills;

Fig. 2 is an enlarged portion of Fig. 1, showing two units of the machine, the first without the barrel and drill and the second with the barrel and drill in place;

Figs. 3 and 4 are a face elevation and plan of the starting lever;

Fig. 5 is a side elevation of Fig. 2;

Figure 18:
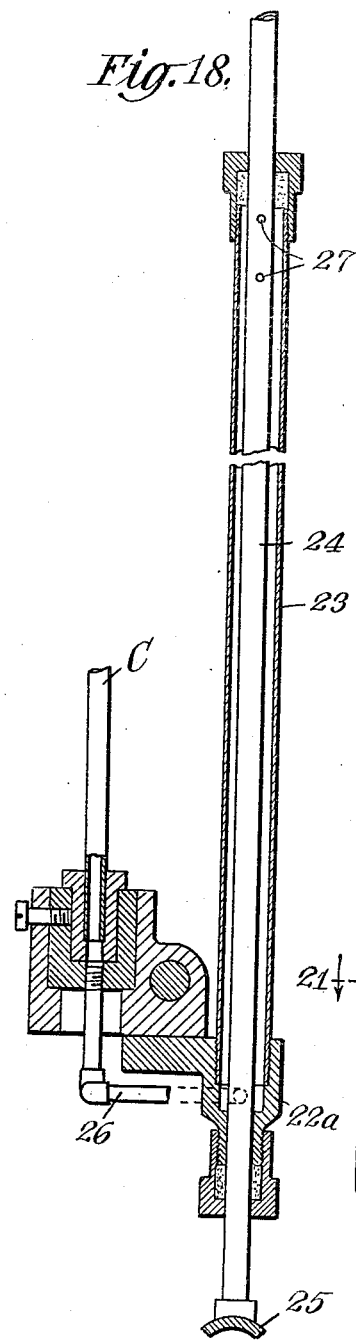
Figure 19:
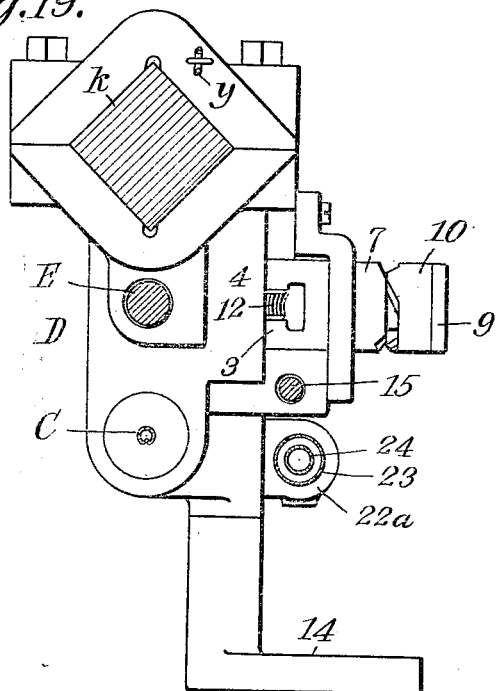
Figure 20:
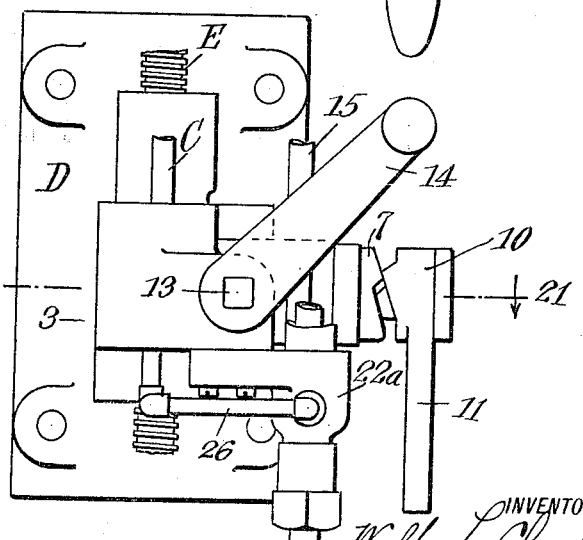

Fig. 5ª is a similar view illustrating certain of the parts in final position;

Fig. 6 is a plan of the same with the motors removed and the top rail broken away at the left;

Fig. 7 is a side elevation of the counterweight for the drill carrier, with the adjacent portion of the frame in section;

Fig. 8 is a similar view of the counterweight for the tail stock which carries the lower end of the barrel;

Fig. 9 is a transverse vertical section, broken away at intermediate points, taken through the center of the barrel which is being drilled; the plane of section being at 9—9, Fig. 11;

Fig. 10 is a plan partly in section of an intermediate guide for the drill;

Fig. 11 is a plan, with the top of the casing removed, of the gearing for driving the drill feed shaft;

Fig. 12 is a vertical section of the same on the line 12—12 of Fig. 11;

Fig. 13 is a horizontal section on the line 13—13 of Fig. 12;

Fig. 14 is a plan of a tail stock for carrying the lower end of a barrel;

Fig. 15 is a vertical section thereof on the line 15—15 of Fig. 14;

Fig. 16 is a horizontal section on the line 16—16 of Fig. 15;

Fig. 17 is a horizontal section on the line 17—17 of Fig. 15;

Fig. 18 is a vertical section through the oil supply pipes to one of the drills;

Fig. 19 is a plan and Fig. 20 a face elevation of a drill carriage;

Fig. 21 is a horizontal section of the same taken substantially on the line 21—21 of Fig. 20;

Fig. 22 is a vertical section substantially on line 22—22 of Fig. 21;

Fig. 23 is a face elevation of a cam which controls the clutching action of the drill carriage with the feed screw;

Fig. 24 is a face elevation of a coöperating cam on the feed controlling arm or lever;

Fig. 25 is a detail of a slide forming part of said clutching mechanism;

Fig. 26 is an elevation, largely diagrammatic, of the electrical controlling devices for one unit of the machine, mounted at the back of the supporting frame;

Fig. 26ª is a detail of the same;

Fig. 27 is a face elevation of a multiple machine for drilling a number of receivers;

Fig. 28 is a side elevation of the same and

Fig. 29 is a sectional view of the work with the drill partly entered therein and the adjacent parts of the machine.

Referring now to the embodiments of the invention illustrated, the machine consists of a number of independently controlled units arranged alongside of one another on a common support. A separate and independent electric motor A is provided for each of said units with a vertical rotating armature, the lower end of which carries a chuck which is adapted to engage the barrel B, Figs. 2 and 9, and rotate the same. A drill C is fed upward into the barrel as it rotates, the drill being mounted at its lower end in a carriage indicated as a whole by the letter D and being fed upward by a threaded shaft E mounted in a suitable bearing block at its lower end and driven at its upper end by gearing from the motor as hereinafter described.

The operation is started by the lifting of a starting handle F on a shaft G which extends through to the back of the machine (see Fig. 5). On the back of the machine there is mounted a number of motor controlling mechanisms one for each of the motors. One of these is indicated as a whole by the letter H, Figs. 5 and 26. It may be of any usual or suitable construction, the construction illustrated being described in detail hereinafter. When the drill, in the course of operation, strikes a hard spot in the work so much heat is generated at the cutting point that there is sometimes a welding of the chip to the end of the drill; and further operation under these conditions is liable to damage the drill or work or both. Such an accident is prevented in all or the majority of cases by the present arrangement. When the resistance of the work to the drill increases slightly beyond the normal the current is cut off from the motor and a dynamic brake applied to stop it instantly. The motor may be adjusted to operate with different amounts of work as the normal, so as to take care of work-pieces of harder or softer steel at the maximum rate of drilling.

An operator standing in front of a machine having, say twelve units as in the construction illustrated in Fig. 1, will place a barrel in the first mechanism and bring the drill into engagement with the lower end of the barrel and will then operate the starting lever F and pass to the next mechanism which will be similarly supplied with a barrel and started; and so on down the line. As the drilling of any barrel is completed its motor is automatically stopped (by mechanism hereinafter described), and the operator will lower the drill, removing the barrel, insert a new barrel and start the drilling thereof as before. In case of an overload on any one of the motors this motor alone will stop and the operator will put in a new drill or otherwise take care of the matter according to the circumstances. All the barrels and drills are easily accessible, being located in the same vertical plane and at the front of the machine so that the operator does not have to lean over one barrel to reach another (as is the case with horizontally arranged machines for this class of work). When there is difficulty in the drilling of one of the barrels the only loss of time occurs on this one barrel, work on the others proceeding quite independently; thus the machine is capable of a large output with comparatively little expense for the attendance of workmen. The rotation of the barrel from the motor is indicated in Fig. 9. The upper end of the barrel is pressed up against the toothed conical opening of a chuck J which is mounted in a sleeve K on the end of the motor shaft L. The sleeve K has an opening M for the escape of oil when the drill breaks through the top of the barrel, the drill being hollow and supplied with oil under forced feed. The design of the chuck J also permits oil to escape around it and into a surrounding oil chamber N with a rearwardly extending spout (Figs. 5 and 6) which empties the oil and chips through a chute O (Fig. 6) into an oil pan P mounted on the back of the machine.

The transmission from the motor shaft to the feed shaft is indicated best in Figs. 9, 11 and 12. The motor shaft L has keyed on its lower end a worm gear Q which drives a worm R on an oblique horizontal shaft S which carries a worm T which drives a worm gear U on a short vertical shaft V which carries at its lower end a spur gear W engaging a similar gear X on the upper end of the feed shaft E. Thus, it will be seen, the motor is always engaged with the work to rotate it and with the feed shaft to advance the drill, and the stoppage of the motor stops both the rotation and feed. Various other arrangements may be made for transmitting the motion of the motor and applying the rotation or the longitudinal feed or both to the work or to the drill.

The lower end of the barrel is carried in a tail stock which I have indicated as a whole at Y and which is best illustrated in Figs. 9 and 14 to 17. The lower end of the barrel B bears on a block Z held up by a coiled spring $a$ in a socket $b$ mounted in the upper part of the casting $c$. This spring bearing block is of importance not only in pressing the barrel firmly upward against the chuck at the head, but also in allowing for a certain amount of expansion after the tail stock is clamped in place and when the barrel becomes heated by the drilling operation. In the lower end of the casting is a block *d* which serves to steady the drill C which passes up through the bearing block Z and is thus guided centrally into the lower end of the barrel. The drill is hollow and oil is forced up from its lower end to its edge, a groove *e* being provided on the outside for the return of oil and chips downward. A washer *f* on the lower end of the block *d* has a projection *f'* entering the groove *e* of the drill. Thus oil and chips from the cutting end of the drill will flow down the drill E and will be discharged into the space *g* surrounding the bearing block Z, whence it will flow off through a tube *h* and the chute *j* (Fig. 5) to the oil pan P at the back of the machine.

The frame of the machine comprises a number of upright guides *k*, preferably heavy square rods, on which are guided the several sliding members. The casing *c* of the tail stock is cast with one of the halves *l* of a slide comprising the parts *l* and *m* which embrace the guide *k*, having flanges fastened (at one side) by stud bolts and carrying at one side a clamping block *o* (Fig. 16) which is mounted on the end of a clamping rod *p* which passes through the casing of the tail stock and has on its front end a clamping nut *q* with a handle for operating it. When the nut *q* is unscrewed slightly it permits the tail stock to be slid up and down by hand on the guide *k*. As shown in Fig. 8 the tail stock Y is connected to a chain *r* which runs up over a pulley *s* and carries a counterweight *t* sliding in a trough shaped guide *u* at the rear of the machine. This counterweight makes it easy for the operator to manipulate the tail stock by hand. To insert a barrel the operator, taking hold of the lower end of the barrel, shoves the upper end into the head stock or chuck on the motor shaft. He then, holding the barrel vertically, brings the tail stock up into proper engagement with its lower end, the block which bears against the lower end of the barrel yielding sufficiently to secure a good spring pressure, whereupon the operator clamps the tail stock in place by turning the nut *q*. The parts remain in this position during the drilling operation. The barrel is formed with a conical projection on its lower end (see Fig. 15) which fits into a tapered recess in the bearing block Z so as to center it during rotation, the bearing block being fixed against rotation by a set screw *v*.

The upper end of the drill is always guided in the tail stock as above described. The lower end of the drill is mounted in a carrier D shown best in Figs. 9 and 19 to 25. The casing of the carrier is mounted with a sliding fit on the guide rod *k*. It also is provided with a counterweight *w* (Fig. 7) traveling in a trough shaped guide *x* at the back of the machine and suspended from a chain *y* passing over a pulley *z*. It is normally raised and lowered by the threaded feed shaft E engaging a long segmental nut 2 fastened in the carriage. This nut is mounted in a slide 3 adjustable transversely in guides 4 and 5 fixed in the carrier, the slide 3 carrying a stem 6 which passes through a bracket 7 fixed on the side of the carrier. A spring 8 between the fixed bracket 7 and the head of the slide 3 presses the latter to the left and tends to throw the nut 2 out of engagement with the threads of the feed rod. The stem 6 carries a plate 9 on its outer end and between the fixed bracket 7 and the plate 9 is mounted a cam 10 with an operating arm 11. The contacting faces of the bracket 7 and cam 10 are shaped as shown in Figs. 19, 20, 23 and 24. When the arm 11 stands in the horizontal position (Fig. 21) the cam will have been turned so as to force the stem 6 and the slide 3 to the right against the pressure of the spring so as to hold the nut 2 in gear with the worm and cause a feeding operation. When the arm 11, however, is turned down, as in Figs. 19 and 20, the cam allows the slide 3 to be pushed to the left by the spring 8 sufficiently to withdraw the nut 2 from engagement with the worm. The arm 11 is operated by hand to make or break the engagement with the feed screw.

The feed screw also engages a spiral gear 12 mounted on a shaft 13 mounted in fixed bearings in the carrier and projecting at the forward face of the carrier, where it is provided with a handle 14. The shaft 13 passes through slots in the slide 3 to permit the lateral adjustment of the slide. While the nut 2 is in engagement with the feed screw E the feed is automatic and the hand operated gear 12 is idle, moving upward with the entire carriage. At the end of a drilling operation the nut 2 will be withdrawn (by hand) from the feed screw by pushing down the handle 11; whereupon the operator by turning the handle 14 in the right hand direction can lower the carriage and the drill quickly to the starting position. Or the same manipulation may be utilized whenever a drilling operation is stopped before completion. When a new barrel is put in and the motor started, the barrel will rotate and with it the feed screw E. To start the feed the operator will have only to pull the arm 11 forward to the horizontal position.

Passing through the carriage is a vertical tripping rod 15 on which the carriage slides freely. The rod at its upper end passes freely through a bracket 16 (Figs. 2 and 5) and is supported by a head on its upper end. It is provided with a tripping stop or collar 17 adapted to be struck by the carriage D when the latter is at its highest point, and with a tripping collar 18 which bears against a pin 19 (Figs. 3 and 4) on a part of the lever F which starts or stops the motor. As the carriage rises, therefore, and arrives at the end of its upward movement it strikes the collar 17, lifts the rod and through the collar 18 throws down the lever F and stops the motor quickly. The operator then shoves the lever 11 down to the disconnecting position and by a few turns of the handle 14 lowers the carriage. After removing the finished work and inserting a new barrel as above described, the operator has only to pull the lever 11 forward, pull the motor starting lever up and hold it for an instant and then to permit it to return to neutral position, whereupon the machine will commence a new operation. The lifting of the starting lever F completes the circuit of the motor, and a latch hereinafter described holds the circuit completed, the lever F returning to its neutral starting position when the operator releases it. The motor continues to operate until the rising of the carriage throws the lever F in the opposite direction. This movement unlatches the starting switch of the motor and causes the breaking of the circuit thereof and the stoppage of the motor.

Where the drill has a very long shank and is of small diameter it is better to have it guided at a point intermediate between the tail stock and the carriage. For this purpose I have provided an intermediate guide 20, Fig. 10, which is mounted on the guide k and has an opening through which the feed rod E passes freely and a bushing 21 through which the shank of the drill C travels easily. A friction block 22 is pressed by a spring against the rear corner of the guide k with such pressure that the guide will remain in any position of adjustment to which it is shifted. The operator, after each operation, and before starting a new one, will shift the guide to the point where the greatest deflection of the drill shank is observed. For example, he may shift it downward by hand to a point just half way between the tail stock and the drill carriage. Then when the drill carriage comes up against the underside of the guide the latter will yield and be carried upward with the carriage. Or the intermediate guide may stand always at the point just above the carriage at the highest point of the latter.

The lower end of the hollow drill C is mounted in a casting 22ᵃ (Figs. 18, 19 and 20) which constitutes the lower end of a large tube 23, closed also at its upper end, which slides up and down with the carriage upon an inner tube 24 which is fixed and is connected at its lower end with a main supply pipe 25 for oil running along the bottom of the machine. A pipe for conveying oil from the larger tube 23 to the hollow drill is indicated at 26. The oil flows from the inner tube through openings 27 into the outer tube and these openings are so located, and the length of the outer tube is such that the openings will be between the heads of the outer tube in all positions of the latter. The oil is under considerable pressure and this arrangement has the advantage of balancing the pressures on opposite ends of the part which slides with the carriage so as to offer no resistance to the movement of the carriage.

The frame of the machine may be of any suitable design. That which I have illustrated has the advantage of being stiff and strong enough, easily accessible and not offering a solid obstruction to the passage of light. The heavy vertical guide rods k, one for each unit of the machine, are held at their upper ends in engagement with the head rail 28 (Figs. 6, 9 and 11), being fastened thereto by the brackets 29 which carry the gearing at the lower ends of the several motor shafts. Each bracket is fastened to the head rail by means of stud bolts 30 (Fig. 11). The head rail 28 is flanged at its ends, as shown in the same figure and bolted to the upper ends of end posts 31; the guides and end posts being mounted on a base 32 with a trough in front in which is located (Fig. 5) the oil main 25 through which oil is pumped under pressure and which connects with the several stationary vertical oil pipes 24. Separate brackets 33 for carrying the upper ends of the feed shafts are bolted rigidly on the guide posts k. A rail 34 is fastened to the end posts and to each of the guide posts k and carries the motor starting levers F and their shafts G; this rail being formed also with brackets which carry the upper ends of the tripping rods 15. Rails 35 and 36 (Figs. 2 and 5) extend along the back of the machine and carry the motor controlling devices. On top of the head rail 28 is carried a bracket 37 which carries the motors A and also the pulleys s, z of the counterweights.

Fig. 26 shows the automatic mechanism for stopping one of the motors on the occurrence of an overload. The current comes in from the mains through the switch 37. The motor armature and field are indicated at the top of the figure, the armature at 38 and the field at 39. The current passes from a binding post 40 to a terminal 41 of the armature switch (which is shown separately in side elevation in Fig. 26ᵃ), thence through such switch as hereinafter described to the post 42, thence to the armature, thence to the post 43 and through the starting resistance 44 to the post 45 which is connected with the opposite main. The motor field 39 is connected at one end to the terminal 41 of the armature switch and at its other end through a post 46 and rheostat 47 also to the binding post 45, so that the opening of the armature switch will leave the motor field still energized from the main line.

The automatic armature switch comprises arms 48 and 49 on opposite sides of a rocking shaft 50 which has also a projection 51 at the back lying in the path of a plunger 52 which slides in a fixed guide $52^a$ and is normally held up by a spring $52^b$ bearing on the guide $52^a$ and against the under-side of a collar on the plunger, said spring having a limited upward movement so as to hold the plunger in the neutral position shown. The plunger is lowered by means of a link 53 and a toggle arm 54 on the shaft G which is turned up by hand, as above explained, and is then released, when the drilling operation is to be started. The upward movement of the starting lever F presses the plunger 52 down (and causes a closing of the automatic switch and a latching of it in the closed position) and, on the release of the operating lever, the spring $52^b$ restores the plunger to its starting position. The switch arm 48 is connected to one of the terminals of an overload relay indicated diagrammatically at 56 from which a connection passes through a point 47 on the switch operating plunger to the post 42 above referred to. When the switch arm 48 contacts with the terminal 41 the current passes from the latter through the coil 56 and thence to the armature.

The arm 48 is normally held outward by a spring $48^a$ on the shaft 50. When the arm is swung inward as described a nose $48^b$ (Fig. $26^a$) on the inner face of the arm rides under and lifts the latch 58 and is caught thereby, so that the latch will hold the arm 48 in engagement with the terminal 41. When an overload occurs the solonoid coil 56 lifts its core 59 until the latter strikes under the latch 48 and swings the latter upward about its pivot $58^a$, whereupon the switch arm is released and is thrown away from the terminal 41 and the connection is broken through this terminal to the armature. The arm 48 swings outward as shown in the full line position, Fig. $26^a$, and the lower switch arm 49 makes contact with the terminal 60 which is connected with the post 43. In this case the posts 42 and 43 at opposite ends of the armature winding are connected through the terminal 60, the arm 49 and rock shaft 50 and the point 55 and the coil 56. This is, therefore, a closed circuit around the armature, which produces the dynamic braking effect desired.

When the armature switch arm 48 is down, and in fact just previous to its engagement with the terminal 41 the operating plunger 52, moving downward, makes a contact with the center of the rocking lever and, therefore, with the point 55. This enables the armature current to travel from the terminal 41 to the plunger 52 and thence to the armature without passing through the overload relay 56. This is essential because it is necessary that the overload relay be short circuited in starting up the motor, as the current flowing in the armature at this time would be in excess of the overload setting and would trip the overload relay instantly after starting. As soon as the switch arm 48 has been moved into contact with the terminal 41 and is caught and held there by its latch 58, the operator releases the starting lever and the spring $52^b$ breaks the direct connection and leaves only the connection through the overload relay 56. For adjusting the machine to a determined resistance, which will depend on the size of the drill, the hardness of the work and various other considerations, there is an adjustment of the strength of the current which will cause a braking action. This is effected by making the overload relay 56 operable under different strengths of current. The usual method is to provide on the lower part of the core 59 a magnetic portion $59^a$ which extends only partially through the length of the coil and which is adjustable up or down so as to bring a greater or less length thereof within the coils and thus to bring it under control of a larger or smaller number of windings of the coil so that a less or a greater strength of current in the coil will cause the pulling of the core upward and the consequent breaking of the connection of the armature with the main line and the completing of a braking loop between the armature terminals.

Where there is no accident in the course of drilling one of the barrels the end of the feed will bring the collar 18 on the rod 15 into engagement with the pin 19 on the starting lever as above described. This will turn the starting lever F down and the rod 52 will, through the intermediate toggle mechanism, be lifted beyond its neutral position. A flange $52^c$ on the rod 52 will strike the end of the latch 59 and will lift the latter sufficiently to release the switch arm 48 which by its spring will be thrown to position to open the armature circuit and to form a braking loop as before, thus stopping the machine immediately.

The coil 61 and connected parts constitute a standard counterelectromotive force type automatic single step starting unit. The principle briefly stated is this: a current, increasing in density as the motor speeds up, is forced back through this coil until it becomes strong enough to raise the core therein, which brings the bridge 62 in contact with the terminals of the resistance 44, short circuiting this resistance and thus removing it from the armature circuit. This and other features of detail need not be referred to more fully herein, since the electrical mechanism shown is only one of many known types of mechanism which may be used for this purpose, and is illustrated here only by way of example.

In adapting the invention to the drilling of rifle barrels we have an extreme case of a long narrow workpiece, and the units of the machine may be assembled so closely alongside of each other that as many as twelve may be gotten in a single machine within the space ordinarily occupied by a two-spindle machine of the common type. Fig. 27 illustrates a machine for drilling the receivers of rifles. This is the part of a rifle which carries the bolt and related movable parts. It has a larger bore than the barrel and is of irregular contour, one design being indicated at 100 in Fig. 29, but even with such workpieces I am enabled to get an eight-spindle machine of my improved design in the space necessary for a two-spindle machine of the old type.

The workpiece is clamped at its upper end in a chuck or socket 101 specially designed for it and provided with clamping screws 102, the socket 101 being fastened on the end of the motor shaft L as in the barrel drilling machine. The work is so short that the distance between the casing 103 which incloses the gearing and chuck or head stock, and the hollow tail stock 104 may be spanned by a tubular casing 105 which carries the oil and chips from the upper end, when the drill breaks through the top of the work, down to the hollow tail stock and through the tube 106 thereof and the chute 107 to the oil pan 108 at the rear. The motor starting levers F are mounted on shafts G as before extending to overload controlled devices indicated at H in the rear. These handles are arranged at a convenient height for the operator, and since the work and the drill are shorter than in the barrel machine, they come near the upper end of the machine. In other respects this machine is substantially like the barrel machine.

The electric motors illustrated are most convenient and particularly compact and are, therefore, of considerable importance in enabling me to arrange the several drilling units close together so as to get the desired large number within a very limited space. Mechanical motors, however, or fluid pressure motors may be used to secure the same operations. The drilling operation may be stopped by stopping only the feed, though preferably the rotation as well as the feed should be stopped in case of trouble. Such an electric or other motor, with automatic overload control would be of advantage with single drilling machines and would permit such machines to be arranged closely alongside of each other with substantially the same effect as is obtained with the machine herein illustrated with its several drilling units mounted on a common support. The rotation of the separate workpieces, rather than the drills, has an advantage in insuring centralization of the drill in the work. This is especially important in working on long narrow workpieces of the the character for which this machine is specially designed.

Though I have described with great particularity of detail certain specific embodiments of my invention yet it is not to be understood therefrom that the invention is restricted to the particular embodiments described. I have designed and built several modifications of the style illustrated, all embodying the same principle, and various modifications thereof in detail and in the arrangement of the parts may be made by others skilled in the art without departure from the invention as defined in the following claims.

What I claim is—

1. A machine of the class described including in combination a plurality of drilling units arranged alongside of one another, independent motors, one for each of said units, and an overload mechanism for cutting off the power from each motor alone when the resistance to its operation increases beyond a determined normal and simultaneously putting a brake on the further movement of the parts of said unit.

2. A machine of the class described including in combination a plurality of drilling units in fixed upright positions adjacent to one another and adapted to hold a corresponding number of long narrow workpieces in upright positions so as to be easily accessible, and to rotate each of said workpieces, independent motors, one for each of said units, and an overload mechanism for cutting off the power from each motor alone when the resistance to its operation increases beyond a determined normal and simultaneously putting a brake on the further movement of the parts of said unit.

3. A machine of the class described including in combination a plurality of drilling units carried adjacent to one another, each comprising a rotatable chuck adapted to engage one end of a long narrow piece of work in an upright position, a tail stock adapted to engage and hold the other end of said work and a drill carriage which is vertically movable to feed a drill through said tail stock and said work, a feed screw, means for rotating the same during a drilling operation and stopping it at the end of such operation, a nut on the carriage adapted to be brought into engagement with the feed screw to effect a feeding operation, or to be withdrawn from such engagement, and a hand operated gear carried by said carriage and engaging the feed screw for retracting the carriage when the feed screw is stationary.

4. A machine of the class described including in combination a number of upright guides, a number of chucks at one end of said guides, a corresponding number of adjustable tail stocks on said guides for holding workpieces in engagement with the chucks and carriages on said guides for feeding drills.

5. A machine of the class described including in combination a number of upright guides, a number of motors and chucks rotated thereby at one end of said guides, a corresponding number of adjustable tail stocks on said guides for holding workpieces in engagement with the chucks and drill carriages on said guides which are given a feeding movement by said motors.

6. A machine of the class described including in combination a number of upright guides, a number of chucks at one end of said guides, a corresponding number of adjustable tail stocks on said guides for holding workpieces in engagement with the chucks and carriages on said guides for feeding drills and intermediate drill guides movable on said upright guides.

7. A machine of the class described including in combination a motor, a rotary chuck and a feed shaft both driven from said motor and an overload mechanism for stopping said motor when the resistance increases beyond a determined normal.

8. A machine of the class described including in combination means for holding one end of a long narrow piece of work and a tail stock for holding the opposite end thereof, said tail stock having a bearing for the work and means whereby said bearing is pressed with a yielding pressure against the end of the work so as to permit a slight expansion thereof.

9. A machine of the class described including a combination means for holding one end of a long narrow piece of work and a tail stock for holding the opposite end thereof, said tail stock having bearings in line with each other for the work and for the drill respectively, the former adapted to permit the passage of oil and chips and the latter to stop such passage, and said tail stock having a chamber between the two bearings for receiving the oil and chips.

In witness whereof I have hereunto signed my name.

WALTER L. CLARK.

Copies of this patent may be obtained for five cents each, by addressing the "Commissioner of Patents, Washington, D. C."